(12) United States Patent
Bailey (10) Patent No.: US 7,506,847 B2
(45) Date of Patent: Mar. 24, 2009

(54) PARALLEL LINK MACHINE DESIGN

(75) Inventor: Ralph-Peter Steven Bailey, Nr Steyning (GB)

(73) Assignee: MakeX Limited, West Sussex (GB)

( * ) Notice: Subject to any disclaimer, the term of this patent is extended or adjusted under 35 U.S.C. 154(b) by 0 days.

(21) Appl. No.: 10/432,042

(22) PCT Filed: Oct. 29, 2001

(86) PCT No.: PCT/GB01/04782

§ 371 (c)(1),
(2), (4) Date: May 19, 2003

(87) PCT Pub. No.: WO02/34461

PCT Pub. Date: May 2, 2002

(65) Prior Publication Data

US 2004/0079844 A1    Apr. 29, 2004

(30) Foreign Application Priority Data

Oct. 27, 2000    (GB)    ................. 0026357.4

(51) Int. Cl.
F16M 11/00    (2006.01)
(52) U.S. Cl. ........................ 248/161; 248/127
(58) Field of Classification Search ............. 248/127, 248/161, 162.1, 404, 405, 157, 419, 163.1; 74/469, 473.12, 473.34, 490.01, 490.04, 74/490.05, 490.08; 901/15, 23, 16
See application file for complete search history.

(56) References Cited

U.S. PATENT DOCUMENTS 3,288,421 A    11/1966    Peterson (Continued)

FOREIGN PATENT DOCUMENTS

DE    196 09 072 A1    9/1997

(Continued)

OTHER PUBLICATIONS

R. Langdon, "Prototyping Techniques", Automotive Engineer, Mechanical Engineering Publ. Ltd., vol. 19, No. 5, Oct. 1, 1994, pp. 44-46.

*Primary Examiner*—A. Joseph Wujciak, III
(74) *Attorney, Agent, or Firm*—Connolly Bove Lodge & Hutz LLP (57)    ABSTRACT

A hexapod machine is disclosed in which six adjustable length struts couple to a controllably moveable platform at three triangularly spaced locations at each of which a pair of struts couple together and to the platform at a bifurcated universal joint. The struts extend away from the platform and through machine nodes defined at triangularly spaced-apart locations in a machine sub-frame, and at each such node a strut extending from one platform location and the next adjacent strut from the next adjacent platform location come together and cross each other in respective hemispheres of a bifurcated sphere journalled for multidirectional pivotal movement in a socket in the sub-frame. The hemispheres each contain a motor which is frictionally engaged with the respective strut so as to enable it to be driven through the hemisphere to adjust its effective length. By control of the motors, the platform position and orientation can be adjusted in space. Also disclosed is a pentapod machine in which a tripod with three adjustable legs defines the position of a first tool support, and the position of a second spaced-apart tool support is defined by two adjustable legs, a tool being supported between said two supports.

28 Claims, 8 Drawing Sheets

U.S. PATENT DOCUMENTS

| | | | |
|---|---|---|---|
| 5,028,180 A | 7/1991 | Sheldon et al. | |
| 5,401,128 A * | 3/1995 | Lindem et al. | 409/132 |
| 5,575,597 A * | 11/1996 | Bailey et al. | 409/201 |
| 5,771,747 A | 6/1998 | Sheldon | |
| 5,857,815 A | 1/1999 | Bailey et al. | |
| 6,196,081 B1 * | 3/2001 | Yau | 74/479.01 |
| 6,681,880 B2 * | 1/2004 | Bernhardt et al. | 180/315 |
| 2002/0010465 A1 * | 1/2002 | Koo et al. | 606/57 |
| 2002/0097932 A1 * | 7/2002 | Roberts et al. | 384/108 |
| 2004/0040805 A1 * | 3/2004 | Bailey | 188/267.2 |

FOREIGN PATENT DOCUMENTS

| | | |
|---|---|---|
| DE | 297 009 379 U1 | 9/1997 |
| DE | 198 36 624 C1 | 2/2000 |
| DE | 199 50 357 A1 | 4/2000 |
| FR | 2 757 440 | 6/1998 |
| JP | 09136286 | 5/1997 |
| JP | 10109285 | 4/1998 |
| JP | 11077577 | 3/1999 |
| JP | 2000288965 | 10/2000 |
| JP | 2006133235 | 5/2006 |
| WO | WO-9747428 | 12/1997 |
| WO | WO-9841773 | 9/1998 |
| WO | WO-9955488 | 11/1999 |

* cited by examiner

PARALLEL LINK MACHINE DESIGN

FIELD OF THE INVENTION

This invention concerns improvements in parallel link machine design. Parallel link mechanisms, in contrast to serial link mechanisms, function in dependence upon the movements of plural linkages working in concert to determine a position, whereas in serial link mechanisms each linkage operates independently.

The Hexapod (see for example WO-A-9217313) is an example of a parallel link machine.

The invention provides new configurations of parallel link mechanisms, which confer advantages of dexterity, compactness, ergonomics and value engineering.

In one aspect of the invention, a new 'bifurcated' drive mechanism is proposed for a Hexapod. It enables two struts to be driven through the same notional focal point, thereby minimising the number of nodes that need to be supported and calibrated. It also enables a snide separation of nodes for a given package size, which improves the stiffness and accuracy. A new kinematic arrangement is also proposed that mitigates the polar nature of the available dexterity, and thereby provides for a more usable articulation range.

In another aspect, the invention also relates to a novel geometry that could be described as a Pentapod, in that it has only five struts acting in parallel. The five strut lengths define an unambiguous 5 axis position. The sixth axis is in common with a spindle, which consequently does not affect normal articulation. Similar to the improved Hexapod, the kinematics enables a consistent range of articulation throughout its working volume.

BACKGROUND OF THE INVENTION

Hexapods are parallel link mechanisms where six variable length struts act together to establish the fully constrained position of an end effector. They have been commonly employed to articulate flight simulators and increasingly in robotics and multi axis machine tools.

Many alternative solutions have been proposed, but all have necessarily been compromises, often resulting in mechanical complexity. The ideal geometry is an octahedron with three nodes at the top and three at the bottom and six struts forming successive triangles in between. In practice this geometry has only been possible where the struts vary their length telescopically between the node joints. This severely limits the ratio of maximum to minimum strut length and hence the articulation range of the hexapod.

Alternatively the struts can pass through the focal points of the nodes to change their effective length between the nodes. However, current designs require that the support frame must then support six individual nodes rather than three shared nodes. Additionally in order to ensure that the withdrawn struts cannot interfere with each other behind the frame, the nodes have to be sufficiently displaced from each other. For a given frame size this reduces the base length of the strut triangles, worsening the vertex positioning leverage. Also the base frame now supports six nodes so will be subject to more bending moments and calibration errors.

Struts have been successfully engineered using hydraulics or screw shafts—in particular ball screws for precise mechanisms. Ball screws however are expensive to make accurately and are generally massive, limiting their length and the speed with which they can be moved. They also do not assist in the application of a suitable length measuring transducer. Either the engineering becomes even more complex or you have to infer the length of the strut from the degree of rotation of the nut—not ideal.

Hexapods are naturally polar devices. As a result they find it easier to point their end effector towards the outside of their workspace, rather than inwards towards its center. It would certainly be an advantage if a hexapod demonstrated a more consistent tilting ability over more of its workspace. Hexapods are also 6 axis, although for machine tool use the common axis with the spindle serves little useful purpose (other than torque constraint). It would be helpful if this extra articulation could also be employed to extend the tilt range.

Hexapod machine tools have currently been packaged such that the workpiece has to be negotiated between either the struts or a similarly obtrusive machine frame. This does not permit ready vertical loading of potentially heavy parts.

Hexapods are six axis mechanisms, whereas strictly it is not necessary for a multi axis machine tool to articulate about more than five, since the sixth is in common with the axis of the spindle. It would save costs if only five servo powered struts were able to constrain the necessary five degrees of freedom.

OBJECTS AND SUMMARY OF THE INVENTION

It is an object of the invention to simplify the kinematics of parallel link mechanisms to make them easier to calibrate, deliver a more useable working volume in a smaller package size, and in particular to reduce their mechanical complexity in order to reduce their cost.

It is a further object of this invention to provide for a more ergonomic machine package that gives ready access to the workspace, is easy to maintain and is lightweight without sacrificing stiffness.

It is a first aspect of this invention to use a friction drive concept to change the effective lengths of the struts, which can then be low cost and lightweight. This technique avoids the mechanical complexity in otherwise restraining the torque generated by the more typical screw drive strut. It also enables the simple integration of a strut length encoder. It also facilitates very long struts and/or very fast movement by reducing the static and inertial mass.

It is a further aspect of this invention to produce a new style of parallel link mechanism that needs only five servo axes to deliver five degrees of freedom. The simplification saves the cost and the error budget of what otherwise would be a redundant axis.

The proposed hexapod uses simple rigid struts that pass through their supporting nodes at one end, permitting almost unlimited extension. However in this invention each strut is mounted in a hemisphere and has a "D" end profile such that it can lie close to the hemisphere's end plane but does not encroach beyond it. In this way when two hemispheres are brought together, the struts in each half can pass each other even as the relative angular displacement of the two hemispheres changes. The fact that the struts cannot both literally pass through the common focal point of the two hemispheres does not introduce any serious buckling moments or errors. Even if the strut is mounted with a loose tolerance, the strut length is not seriously compromised as this error is normal to the strut; i.e. if the strut is 1 m long and the displacement error is 1 mm, the measured length error would only be 0.5 micron. The combined effect is like a bifurcated drive sphere with two struts passing through it.

The struts can be produced by the extrusion of aluminium or the pultrusion of a suitable composite (such as carbon fibre). With a substantially hollow section they deliver much better stiffness to weight than a solid strut and consequently also have higher resonant frequencies that are easier to damp. They are held and driven by frictional contact with rollers otherwise retained in each hemispherical node. This style of drive is often referred to as a capstan or friction drive.

As the strut doesn't need to rotate or hold an external thread, a linear measurement scale can be readily incorporated. With the read head located in the hemispheres, this will then read the absolute displaced length; rather than a nut rotation that is subject to several stages of mechanical error. Also the measurement scale can be mounted on a thermally neutral substrate (like carbon fiber or Zerodor) such that length measurement is not unduly effected by changes in temperature.

Because the circumference of a friction wheel is necessarily greater than the lead pitch of a ball-screw, a gearbox needs to be introduced for the motor to increase its torque and reduce its speed. Conventional gearboxes all suffer from backlash, which can only be reduced at significant cost.

In a preferred embodiment, 4 friction rollers are used to support the strut and are all driven. This reduces the holding preload necessary to ensure adequate friction to avoid skidding compared with having perhaps just one friction drive wheel and the rest 'idling'. They would all have "V" profile rims to make two contact zones with the struts runners. These runners can be made out of suitably hard material and are retained on either side of the strut profile.

The bifurcated drive spheres are retained in a split socket ring, permitting the struts to pass through the joint. The two rings are preloaded together to main a constant clamping force around the sphere. They are internally recessed such that all the contact occurs along a bearing strip running along the top and bottom edges of the socket.

To minimize the friction the socket should extend as far around the drive sphere as is consistent with acceptable strut articulation. Determining the movement range of each strut necessary to enable the planned working volume and factoring in the struts "D" profile allows the boundary locus to be optimized. The resulting boundary looks like two non-mirroring lobes.

An elastomeric boot can encapsulate each side of the joint from the socket rim to the further boot that protects the strut. This will retain a suitable lubricant and protect the joint from particulate ingress.

The other ends of the 6 struts are connected in pairs into 3 bifurcated ring joints mounted in a triangular configuration on the effector frame. Each joint must permit the strut pair to change its vertex angle and freely tilt and twist about a common focal point. A simple way of achieving this is one of the subjects of this invention.

A precision ball is retained by a short support shaft to the effector frame. The first strut is connected to a ring that loosely circumscribes the sphere with an inward facing "V" profile. On either side farther bearing rings are installed internally conforming to the sphere in the manner of a split socket.

These baring rings are made out of a low friction plastic such as a compound of PTFE. They can accommodate a small reduction in diameter because of their thermoplastic nature, which also helps them grip the sphere sympathetically. PTFE in particular will slowly deform under pressure to conform to its constraints.

The second strut is connected to another slightly offset ring that runs alongside the first strut ring with an inward facing chamfer to trap one of the bearing rings. A second 'preload' ring similarly traps the second bearing ring from the other side and is preloaded towards the second strut ring (typically by fasteners with disc spring washers).

The preload effectively squeezes both of the strut rings against the upper chamfers of the bearing rings; thereby constraining them to a common pivot axis that also passes through the focal point of the sphere. The common axis allows the struts to change their vertex angle; and the pair act together like a socket ring permitting three degrees of freedom about the sphere.

These components can be produced at low cost because they are self-centering and conforming; and receive all of their critical accuracy from a single turning operation set-up.

The joint resembles a rod end bearing and as such can accommodate 360 degrees of rotation about its support stub axis. Correctly aligned this helps to ensure the most useful overall joint articulation. Also the tension or compression in the struts is applied largely normal to the sphere thereby not pinching it and unduly increasing the friction as would occur in a conventional ball and socket.

If the sphere and the rings were subject to different temperatures, the preload would accommodate the change moving the struts slightly apart along their common pivot axis and thereby introducing very little net strut length error. This is again unlike a conventional ball and socket joint where in similar circumstances the ball will tend to pop out of the socket and directly effect the strut length.

The entire joint can be encapsulated in an elastomeric boot that can also contain a suitable lubricant; thereby ensuring long life and minimum friction.

Most current hexapods have had a symmetrical arrangement of base frame and effector frame, generally with the mechanism suspended vertically. The tilt range of the effector is then modified by the overall suspended angle of the mechanism in a polar fashion. Typically if the effector can tilt by +−45 degrees and the mechanism heals over by 45 degrees then the tilt in a Cartesian frame of reference would be +0-90 degrees. This is generally a disadvantage.

This invention proposes a kinematic arrangement where the hexapod acts from one side (rather than above) but with the spindle still pointing down, and where the effector frame has an angular offset from the general mechanism. In this configuration rotation permitted in the spindle axis (which is generally greater than in the tilt axes) is instead 'mixed in' to the tilt axes to extend their useful range.

This makes sense also because the more useful working volume is a cylinder larger in diameter than its height. Therefore with the mechanism acting principally horizontally, the polar behavior that compromises the tilt range occurs over the smaller z displacements. In the preferred x-y plane no tilt bias is generated.

Furthermore by tilting the elector frame a tilt range bias can be introduced which mitigates the z displacement polar effect when the struts are short and thereby helps to maintain a consistent tilt range. It has been found that with such an arrangement a tilt range of +−45 degrees can be maintained over all of the x,y and most of the z.

A collateral benefit is that the frame supporting the drive nodes is now closer to the work deck and therefore easier to integrate rigidly. It also does not obstruct the vertical space, enabling more ergonomic access.

The frame holding the work deck and the adjacent more vertical frame holding the drive nodes can be integrated into a single casing (or split for manufacturing convenience). This casting may have a 'smooth' internal surface (for easy machine cleaning) and external webs to stiffen it along its node to node force concentrations. A further tubular framework can then support the casing at a convenient height and also help to stiffen it.

This framework looks like another hexapod, the upper 3 nodes supporting the work deck area and with the lower triangle having a single node to the rear. From this node two further support struts rise up in a "V" to connect with the back of the vertical part of the frame (at a junction of stiffening webs).

A cover can be provided like an open pod or cowling that encloses the whole working volume. This can be pivoted and supported on gas springs so that it can be raised clear of the workspace, providing excellent all round access.

The frame castings and cover can be sized to enable only the desired work and articulation space. This keeps the machine very compact. In one embodiment a machine with a footprint of about 1 m*1.3 m has a 3 axis volume of 600 mm dia.*400 mm high, and a full tilt 6 axis volume of 400 mm dia.*250 mm high.

The combined effect of an efficient node to node framework, lightweight hexapod mechanism and a tailored enclosed space is a machine that is close to an order of magnitude smaller and lighter than conventional 5 axis machine tools: Integrating a tool rack into the frame casting can facilitate automatic tool-change. Conveniently this would be behind the work deck where it can be reached by the spindle but does not obstruct the workspace, and arranged such as to hold the tools at an angle facing inwards. A suitably equipped spindle can then deposit its old tool in a vacant retainer and pick up the new one from the available selection. Apart from a moveable swarf shield the rack is passive, therefore low cost and robust. All the movement to effect the tool-change is performed by the hexapod at no cost or complexity premium.

The machine packaging concept thus far described suits its application as a self contained machining cell. However the light weight and elegant 3 node mounting of this style of hexapod lets it be supported by simple open tubular frameworks, to enable much increased working volume or integration with other factory automation.

One such framework is proposed where the three drive nodes are connected by frame members and arranged with one node at the bottom and the upper two nodes leaning inwards. Six frame members describe a tetrahedron that supports the lower of the drive nodes at its vertex (with one base node to the rear). The other two drive nodes are then connected by frame members to both the front two base nodes, and in a "V" to the rear base node. This architecture is fully constrained and does not obstruct the struts either in front or behind. It enables a mechanism module to roam over uncommitted space where the user may construct his bespoke workcell. It could be mounted on a turntable (as a seventh axis) which enables wide all round reach as would particularly benefit a robotics application.

Thus far the mechanism has been described retained on its side. Some applications may benefit from it being mounted vertically. In such an embodiment frame members would again connect the three drive nodes, but this time pairs of struts connected together like a hexapod without a base frame would support them. If these struts were of adjustable length (such as telescopic), the three base nodes could be freely located around the work-cell (both above and below it) and the mechanism optimally positioned.

The invention as so far described concerns the embodiments of a hexapod with six nodes and six variable length struts. However there is another fundamentally different geometry which can be employed for multi-axis machine tools. It has been referred to hereinbefore as a Pentapod.

In this embodiment only five struts are employed acting between seven nodes. They are arranged as a tripod and a "V". The spindle acts as a spacer between the vertex of the tripod and the vertex of the "V". Individual drive nodes support the other ends of the struts. They are naturally spaced apart so the withdrawn struts cannot interfere at the rear.

This arrangement is more economical in only needing 5 servo axes. The sixth axis not otherwise constrained is the one in common with the spindle, so does not limit the necessary 5 axis articulation. Spindle torque will introduce some small bending moments into the struts, but these forces are generally readily managed.

This architecture delivers consistent maximum tilt over its entire preferred x,y plane. Some polar bias is introduced with z displacement, more on the inner facing side (x min) than the outer (x max).

The preferred drive concept would be a friction drive as described for the hexapods bifurcated nodes, except in this case the nodes are individual spheres (not hemispheres). The struts can then have more efficient round rather than "D" cross sections, with runners still supporting them on opposite sides. Also with free use of the whole sphere, more economical bearing arrangements can be used to retain the friction wheels; and more space afforded to the motor.

Sockets rings can again retain the spherical drive nodes, being preloaded together to maintain stiffness and sealed on either side with a boot. Because the drive spheres can rotate in the plane of the socket the struts do not need a swivel enabling end connection (as in the hexapod).

The vertex for the tripod is a trifurcated joint whose design is also one of the subjects of this invention.

The object is to being four struts together at a common focal point, such that two pairs of struts share common pivot axes and that one pair can additionally tilt and rotate about the other.

The pair that need to articulate about the focal point are substantially arranged as the previously described 'rod end' style bifurcated ring joint as used to support the effector of the hexapod. Only in this case the ball is itself bifurcated, comprising of two hemispherical shells. One shell is connected to the 'reference' strut, the other to the spacer frame that runs between the two nodes. They are held together by the 'rod end' bifurcated joint ring and additionally constrained to a common pivot axis by internal mating radial features. The preload established on the outer bifurcated ring reflects through the whole joint, theoretically maintaining all bearing interfaces at the required pressure.

The joint can be encapsulated in a protective boot that also retains suitable lubricant.

The fact that the 'reference' strut can only pivot in one axis with respect to the spindle is a blessing as it acts to counter the spindle torque. This capability becomes increasingly necessary if the lower two struts do not share a common pivot point as the feed force of the spindle could introduce some additional torque.

It is desirable to make the lower struts share a common vertex point, but there is equally a need to let the spindle act along the axis between the tripod and "V" nodes. To accommodate both preferences a bifurcated ring joint would have to have a large diameter in order to allow the spindle to pass through it, and then would be difficult to seal. A reasonable compromise is to accept a displacement between the rower strut pivot points in order to allow a spindle to be mounted between them. Basic rod end type joints can then support the strut ends.

For the low cost market for which the Pentapod is proposed, flexibility in the type of spindle or end effector employed is advantageous. Perhaps most desirable is not to have a spindle at all, but a compatible mount for a powered hand tool like a Dremmel. This would allow the user to replace the most vulnerable part of any machine tool—the spindle—at low cost, and also provides access to the wide range of cutting, grinding and polishing fittings available for it.

By its nature the Pentapod has a spindle axis orthogonal to the 'centerline' of the mechanism. It can therefore be 'packaged' much like the side acting hexapod previously described, with a side acting mechanism and horizontal work deck.

However because it is envisaged that the Pentapod will be significantly smaller and will generate considerably lower frame loads than the previously described hexapod, it can be offered as a 'desk top' model without the additional external tubular framework. A single casting can then incorporate the entire support structure from drive nodes to work deck.

A single cowling can again enclose the workspace ensuring safe and clean usage.

In order that the present invention, in all of its aspects, might be clearly understood, exemplary embodiments will hereinafter be described with reference to the accompanying drawings.

DETAILED DESCRIPTION OF THE EMBODIMENTS

Figures 1, 2, 3:
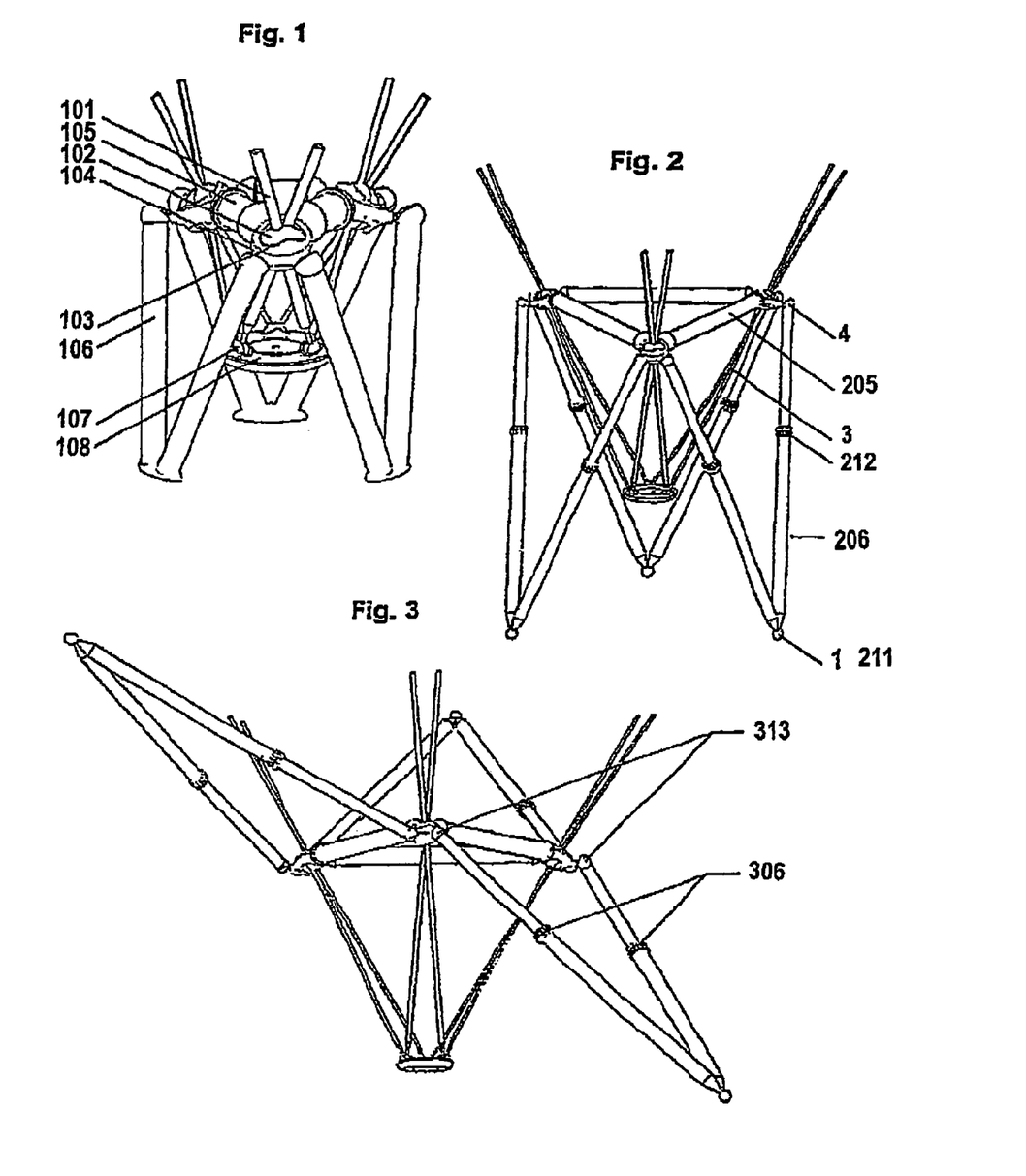
FIG. 1 is a perspective view of an exemplary Hexapod embodying the present invention.
FIG. 2 shows an alternative Hexapod embodiment.
FIG. 3 shows the embodiment of FIG. 2 with its support leg mounting points differently arranged.

An embodiment of a 6 node hexapod is shown in FIG. 1. The struts (e.g. 101) cross over in, and can pass through bifurcated drive spheres (e.g. 102), supported in sockets (e.g. 104). The other ends of the struts join in pairs at bifurcated spherical joints (e.g. 107) connected with each other by sub-frame 108. As will be described in detail hereinafter, each strut 101 has a semicircular section and has friction wheel runners bonded to its sides. Each bifurcated drive sphere 102 allows two struts 101 to pass through it as near to its split line as practical. Each drive sphere 102 is journalled in a spherical socket 104 having bi-lobar socket windows 103 that permit symmetrical articulation of the strut pair, traversing each drive sphere 102. The sockets 104 are formed by corner moldings that connect to spacer struts (e.g. 105) which define the distance between drive sphere focal points and can be adjustable in length and to respective support legs. (e.g. 106). The bifurcated joints 107 permit respective pairs of struts to share a common focal point, articulating about 103 axes as a pair and able to change their relative subtended angle. By control of the friction drives in each drive sphere hemisphere, the lengths of the struts between the drive sphere focal points and the bifurcated joints 107 can be controlled so as to determine the position and orientation of die sub-frame 108.

FIG. 2 shows an embodiment of a similar hexapod concept to that illustrated in FIG. 1, except that the support struts (support legs 206) are now additionally joined at their ends 211 and can have their lengths changed by being telescopic with twist-to-lock extension lock (e.g. 212). The drive node spacer (e.g. spacer strut 205) is now much longer, increasing the working volume without compromising the kinematics.

FIG. 3 shows the same hexapod as is illustrated in FIG. 2, but this time with the mounting points for the support legs being repositioned according to the situation preference. The only rule to maintain structure stiffness is that all three strut pairs have to act in significantly different planes.

Figures 4A, 4B:
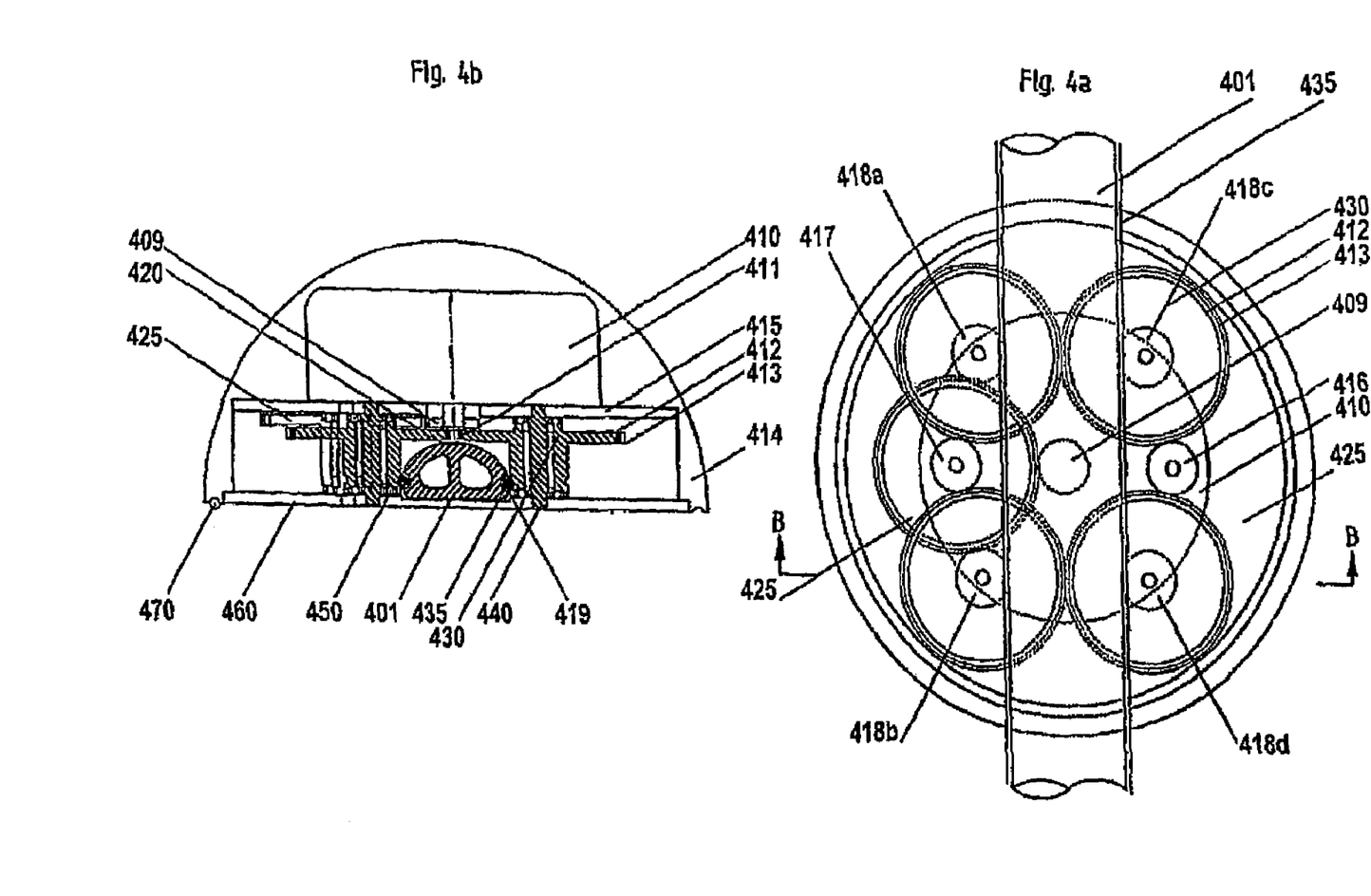
FIGS. 4A and 4B show, respectively, schematic plan and sectional side elevation views of a hemispherical friction drive arrangement for a D-section Hexapod strut.

The bifurcated drive spheres in the Hexapod embodiments described with reference to FIGS. 1, 2 and 3 may be as shown in FIGS. 4A and 4B which show schematic top plan and sectional side elevation views of one hemispherical half of such a sphere. As shown, each hemisphere comprises a housing 414 which contains an electric motor 410 driving a pinion 409 which is in frictional engagement (as will be described in detail hereinafter) with friction wheels 425. Each wheel has a lesser diameter portion 417 defining a pinion which frictionally engages respective pairs of strut drive wheels 418a, 418b 418c, and 418d. The strut drive wheels 418a, 418b 418c, and 418d themselves have lesser diameter roller portions which frictionally engage the sides of the struts 401.

As abovementioned, within each bifurcated drive sphere a strut 401 is retained by friction rollers 418a, 418b 418c, and 418d, each extending to become the larger friction wheels (e.g.) 430. These wheels have an elastomeric band 412 and a springy steel band 413. Where they contact each other or the smaller pinion gears 416 and 417 or the motor input gear 409 they deform slightly to retain contact pressure under elastomeric and spring band preload. Also the struts have runners (e.g. 435) which are supported in elastomeric saddles 419, such that they and the saddle deform under contact pressure to retain preload. By this means all the frictional interfaces can be maintained at a useful working pressure. The elastomeric saddles 419 are each bonded into an axial depression in the edge of a strut, which then have the runners 435 bonded into them. An encoder track can be bonded into an upper depression 420. The runners can comprise spring steel rods. The combined friction drive wheels 418 and larger friction wheels 430 are supported at their ends on needle roller bearings 450 for rotation about axles 440 supported between end plates 460 and 415, the latter also serving to support the motor 410.

Reference numeral 470 shows a ball otherwise part of a radial array running in a gothic arch groove around the hemisphere. This locates adjacent hemispheres and permits them to rotate about a common pivot axis. Reference numeral 416 shows an optional idler wheel. Adding it into the gear train increases the number of frictional drive interfaces with a commensurate reduced need for contact pressure. It also helps to keep the train synchronized and thereby better able to deal with local corruption.

Figures 5A, 5B:
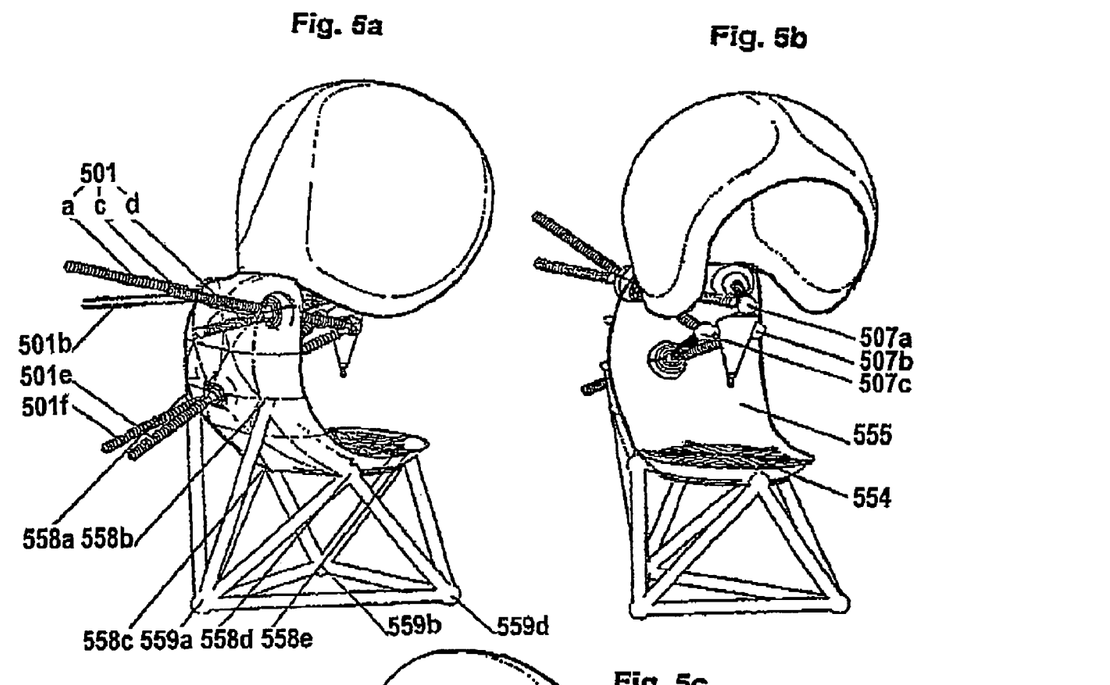
FIGS. 5A, 5B and 5C are different perspective views of a horizontally mounted hexapod arrangement having a vertical spindle orientation.
Figure 5C:
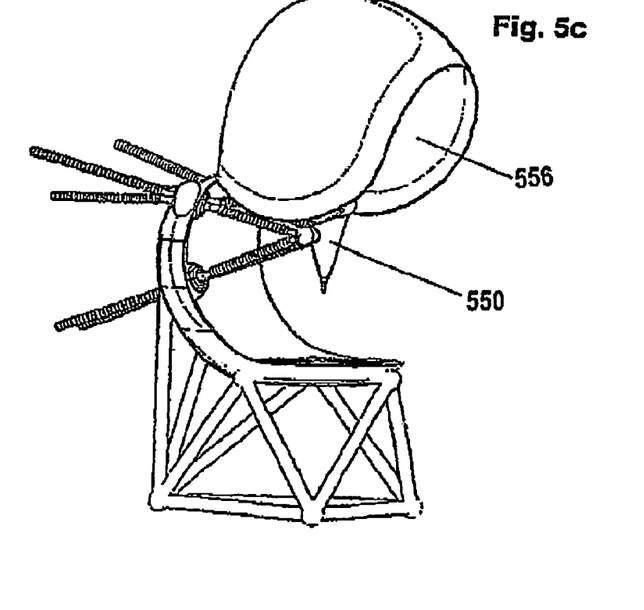

FIGS. 5A, 5B and 5C show three illustrative views of an embodiment of a packaged hexapod machine where the mechanism is mounted principally horizontally and the spindle head sub-frame at an offset angle. The six struts 501a-f are shown crossing over in pairs as they pass through the bifurcated drive spheres. In this case they axe shown protectively shrouded with an elastomeric concertina cover. The three bifurcated rod end type joints 507a, b and c connect the strut ends to the spindle housing 550. A casting 555 constitutes both frame and packaging. It starts as a dish surrounding a worktable 554, and curls up to become the mounting for the drive spheres. On its backward facing side it has integrated ribs to act as stiffeners. The worktable 554 is retained by webs to the dish of the frame casting 555, permitting swarf to fall through to an underside collector. The spindle unit 550 is shown at its center default position. A cover 556 with integrated windows is shown in its raised position and can be lowered to isolate the work area. Support leg members (+3 on the base level) are provided for the frame casting and attached to the frame casting, at the five points 558a-f and meet at base level at the three points 559a, b, and c.

Figure 6:
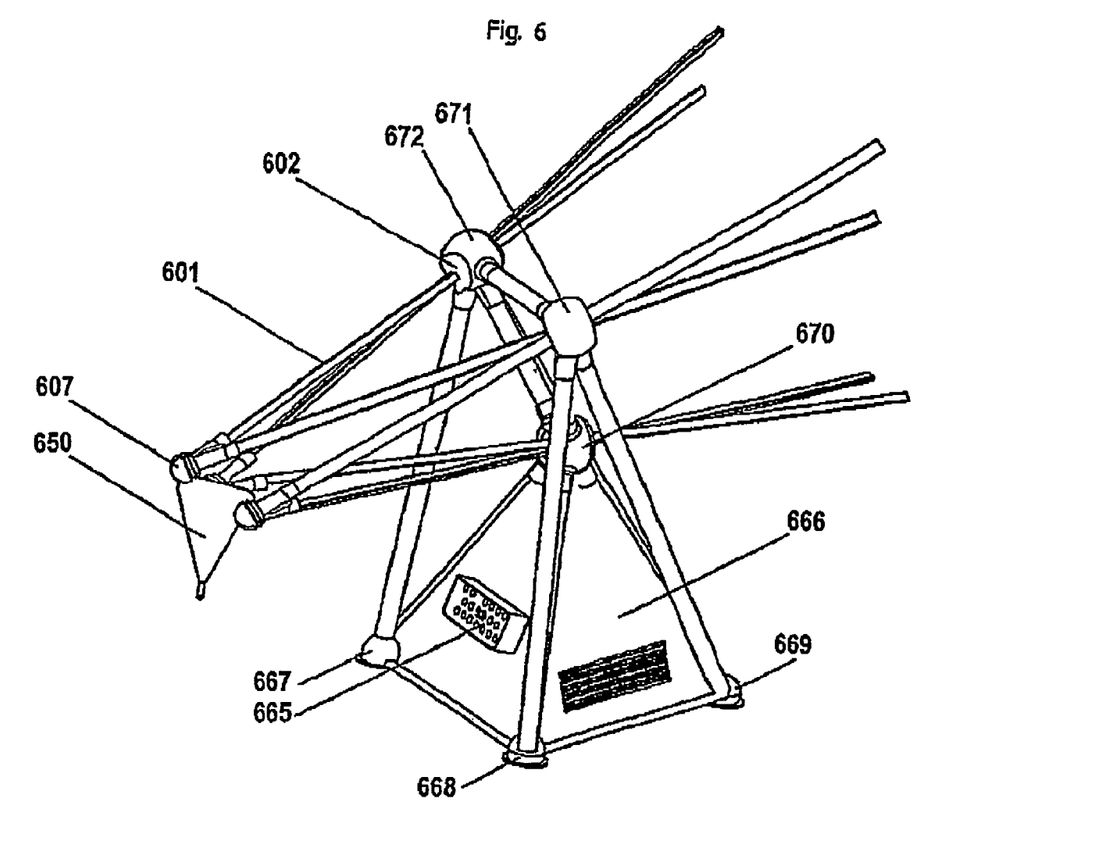
FIG. 6 is a perspective view of yet another Hexapod embodiment.

Referring now to FIG. 6, this shows an embodiment of a six node hexapod with three bifurcated drive nodes (e.g. 602) and three bifurcated link nodes (e.g. 607) with the six legs (e.g. struts 601) connecting the same able to be driven through the drive nodes thereby varying their effective lengths. The support framework consists of three base struts connecting the rigid base junctions 667, 668 and 669. Three further struts connect each base junction to a common vertex junction 670 that also supports a bifurcated drive node. Two further struts then extend up to the peak junctions 671 and 672 that also support bifurcated drive nodes. Four further struts then connect back down to the base junctions (two from each node) such that the rear struts connect to a common base junction 669 and the forward struts connect to adjacent base junctions 667 and 668. Such a structure is kinematically pure in that all forces have been resolved into tension or compression. It comprises of a total of thirteen struts. The spindle unit 650 is attached to the three link nodes. An array of holders for alternate tools 665 can be situated such as to enable the spindle head to articulate around so as to be able to auto-change the current tool. In this embodiment the lower tripod of the support frame is in-filled with panels (e.g. 666) so as to enclose system services.

Figure 7A:
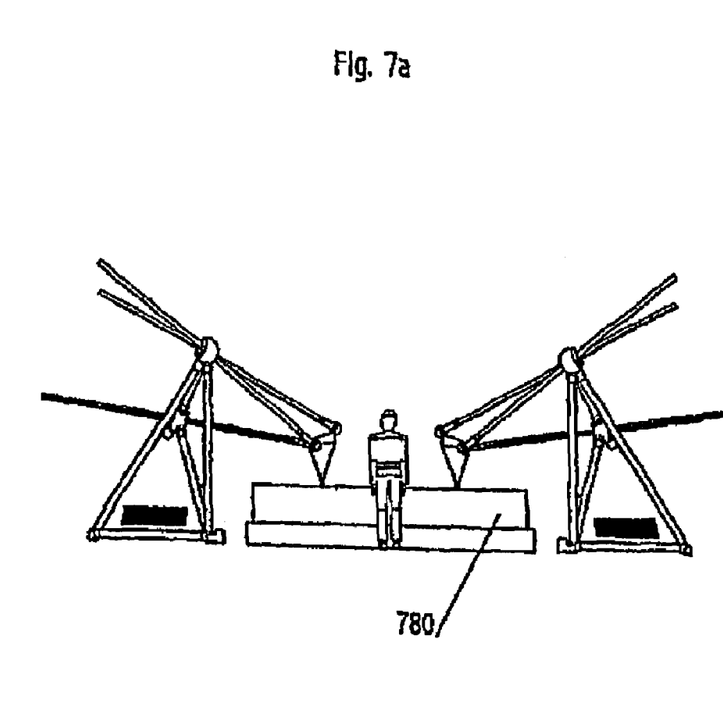
FIGS. 7A and 7B show, respectively, a side elevation view and a top plan view of a workstation incorporating two Hexapods as in FIG. 6.
Figure 7B:
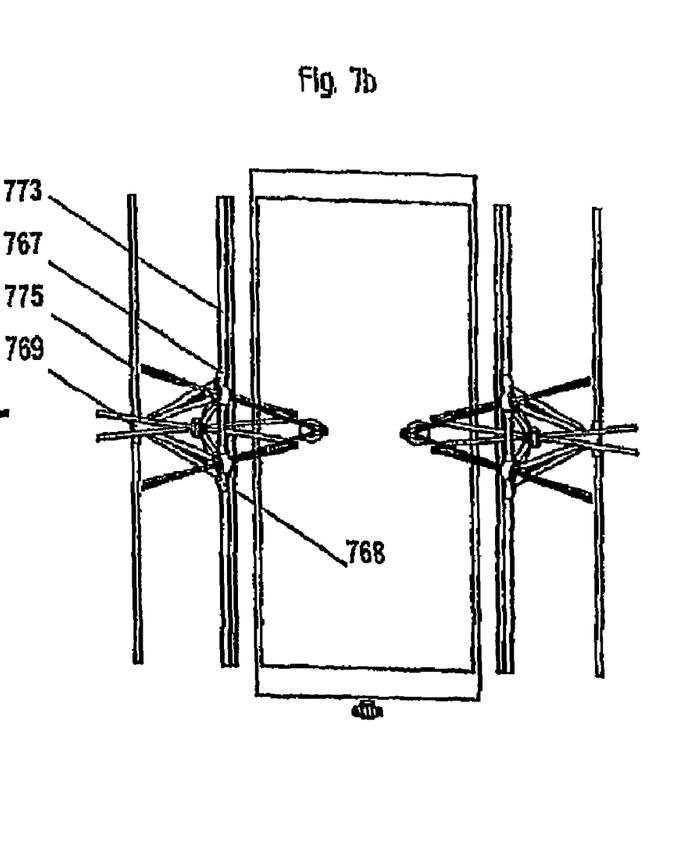

FIGS. 7A and 7B shore side and plan views of two, six node hexapod modules essentially as described in FIG. 6. Each is mounted on rails such that for each module, the two forward base nodes (e.g. 767 and 768) run on a common rail (e.g. 773) and such that the rear base nodes (e.g. 768) run on parallel and discreet rails (e.g. 775).

In this embodiment the two modules can run on separate rail pairs on either side of the workpiece 780, being driven along the rails by a linear motor system, for example.

Figure 8A:
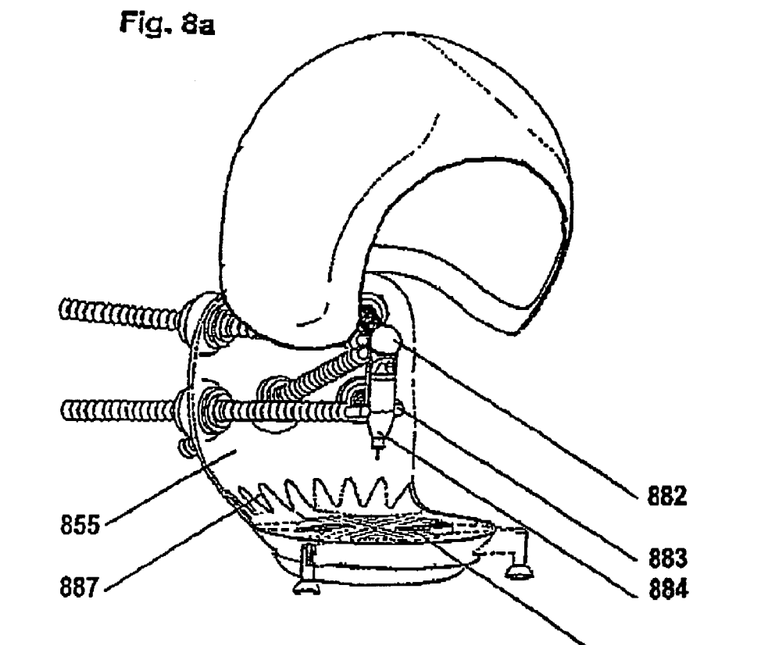
FIGS. 8A and 8B are front and rear perspective views of an exemplary Pentapod embodying the present invention.
Figure 8B:
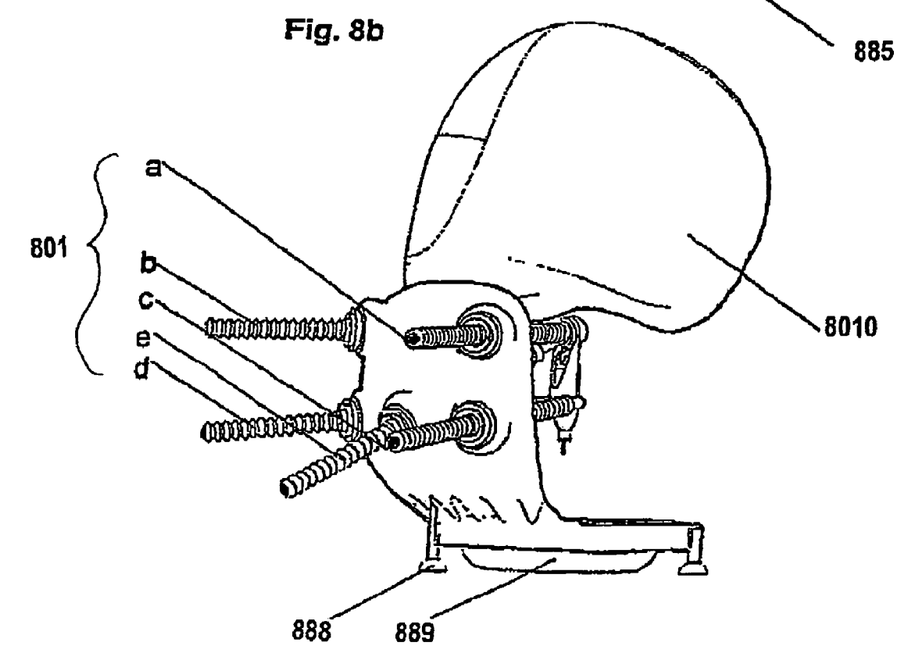

An embodiment of a Pentapod machine is shown in FIGS. 8A and 8B. The five struts 801a-e pass through individual drive spheres supported by annular sockets retained by a frame casting 855. Three of the struts (a, b and e) terminate at a common focus trifurcated joint 882, the other two have individual universal joints 883 connecting them to the spindle support. The struts are shown shrouded with elastomeric concertina covers. The trifurcated joint 882 permits two struts 801a and 801b to have a common pivot axis and as a pair to articulate with three degrees of freedom about a common pivot point and with a third strut 801e sharing the same notional pivot point and able to tilt independently in one axis with respect to the spindle support.

A removable hand router 884 is shown fitted into the spindle support, this being but an example of the provision of a tool in the pentapod. A worktable 885 is supported by webs to the dish of the frame casting 855 which curls up from the dish around the worktable to go on and support the drive spheres. The frame casting could be assembled out of two parts with an interface 887 filled with a damping elastomer. The frame casting is supported on three legs 888 and has a removable underside swarf tray 889 and a cover 8010 with integrated windows shown in its elevated position.

Figure 9A:
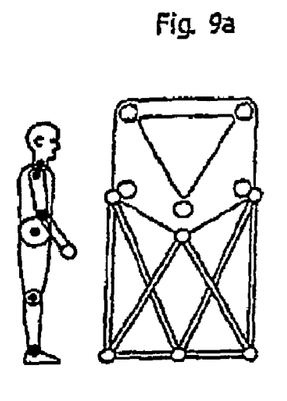
FIGS. 9A, 9B and 9C are, respectively, schematic front and side elevation views and a top plan view of a Pentapod mechanism.
Figure 9B:
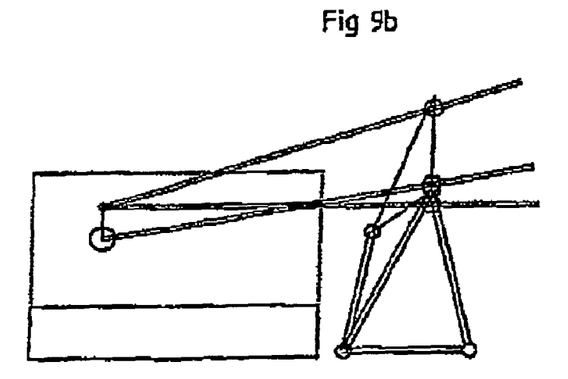
Figure 9C:
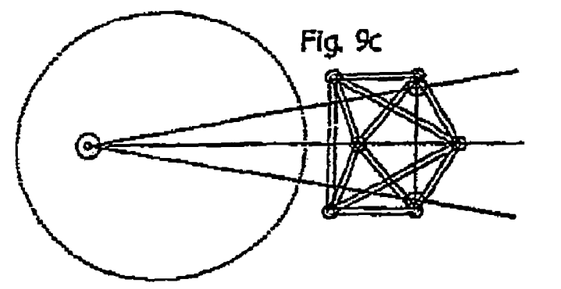
Figure 10A:
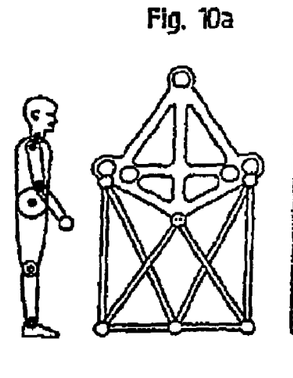
FIGS. 10A, 10B and 10C are views similar to those of FIGS. 7A, 7B and 7C but showing a different Pentapod arrangement.
Figure 10B:
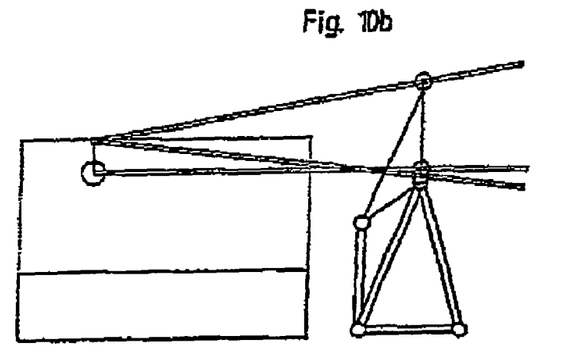
Figure 10C:
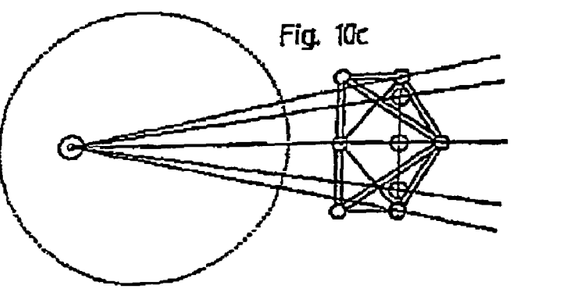

FIGS. 9A, 9B and 9C show a conceptual front and side elevation and top plan of a large format pentapod mounting scheme. The dotted cylinder indicates the working volume. An alternative node layout of a large format pentapod is shown in FIGS. 10A, 10B and 10C. The dotted cylinder indicates the working volume.

Figure 11A:
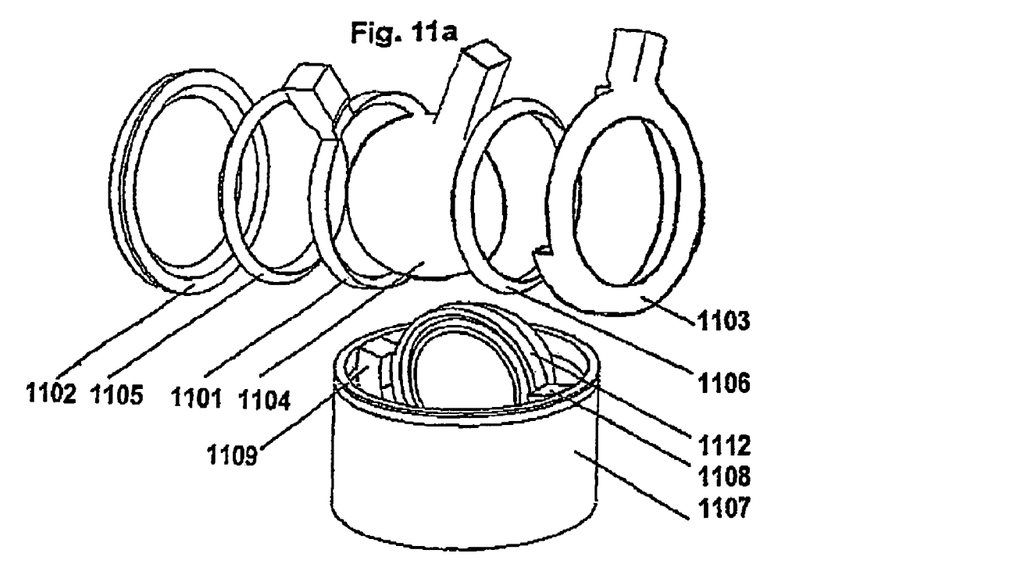
FIGS. 11A and 11B show, respectively, an exploded view and a side elevation view of a trifurcated joint.
Figure 11B:
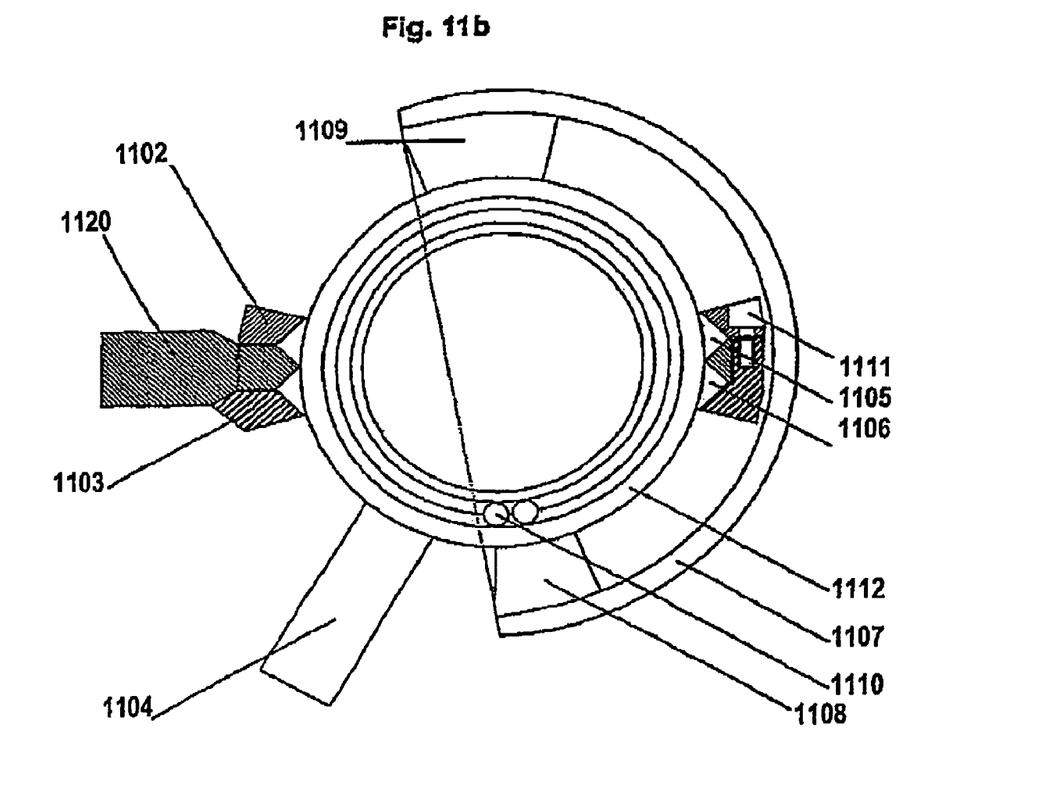

An exploded view and a sectional illustration of a trifurcated joint, are shown in FIGS. 11A and 11B. A strut carrying ring 1101 is trapped between two annular wedges 1105 and 1106, in turn trapped between a strut supporting rim 1103 and a clamping ring 1102. The assembly clamps around a strut supporting hemisphere 1104 and a reference hemisphere 1112.

When the clamping ring 1102 is tightened against the strut supporting ring 1103 it squeezes the wedges 1105 and 1106 inwards to increase their holding preload, and in turn retains all the moving parts under similar preload. In more detail, the strut carrying ring 1101 has two inward sloping contact faces. The clamp down ring 1102 has an inward sloping contact face. The strut supporting ring 1103 has an extended cut-away flange to allow strut 1120 to exit when the clamp down ring 1102 is attached. It also has an inward sloping contact face. The articulating hemisphere 1104 includes a conforming annular ball track with the reference hemisphere 1107 about which it can then rotate on a common axis. The annular wedges 1105 and 1106 conform to the curvature of the hemispheres on their inward surface and have conforming outward sloping contact faces with the parts 1101, 1102 and 1103. A shell 1107 retains the reference hemisphere 1112 via supports 1108 and 1109. Balls 1110 run in an annular gothic arch profile track on the reference hemisphere 1112, a complementary track being provided on the other hemisphere 1104. Reference numeral 1111 shows provision for one of the fasteners employed to retain and preload the clamp down ring 1102 against the strut supporting ring 1103.

The invention having been described in the foregoing by reference to specific embodiments, it is to be appreciated that the embodiments are in all respects exemplary and that modifications and variations are possible without departure from the spirit and scope of the appended claims. For example, the multiple machine arrangement of FIGS. 7A and 7B could be differently arranged and could utilize different machines and/or different machine combinations. Several similar or different machines could share a long single rail pair and be arranged to operate under a control program enabling the different modules to cooperate in the machining of the same workpiece or to work on different components. In a flexible facility, modules could be arranged to be movable between different rail systems to optimize on the current application need.

The invention claimed is:

1. A machine comprising elongate struts forming a hexapod structure that can be driven through machine nodes to vary the effective strut length, and
   wherein at least two struts share a bifurcated drive sphere, said hexapod structure comprising six elongate struts with a sub-frame and a platform movable relative thereto and six nodes, three of said nodes connecting alternate strut pair ends to the platform by multi-axis couplings and three of said machine nodes defined in said sub-frame comprising bifurcated drive spheres,
   each said bifurcated drive sphere being retained within a complementary socket mounted on said sub-frame, each said bifurcated drive sphere retaining a pair of adjacent strut pairs such that adjacent struts of said pair can pass through said retained bifurcated drive sphere and cross over each other within said retained bifurcated drive sphere with pivotal movement about a common axis,
   wherein said bifurcated drive spheres each comprise two hemispheres, one for each strut passing through the respective bifurcated drive sphere, the two hemispheres being spherically arranged with respect to each other so as to be pivotable relative to each other about a common axis, and the spherically arranged hemispheres being retained in said complementary sockets providing for multi-axis movement thereof, and
   wherein each of said struts has two ends and the retained bifurcated drive sphere is located on and between said two ends.

2. A machine as claimed in claim 1 wherein alternate strut pair ends couple to the platform with bifurcated multi-axis couplings.

3. A machine as claimed in claim 1 wherein the strut ends connect to the platform each by way of its own discrete multi-axis coupling.

4. A machine as claimed in claim 1, wherein said struts are generally semicircular or D-shaped in cross-section, and the two struts sharing a common node are arranged with their flat surfaces facing each other.

5. A machine as claimed in claim 1 wherein the three bifurcated common nodes are spaced apart by a generally triangular framework of adjustable members enabling the spacing of the nodes to be adjusted.

6. A machine as claimed in claim 1, wherein the three bifurcated common nodes are spaced apart by a generally triangular framework which is itself supported via at least two degree of freedom linkages to three pairs of adjustable length struts, said adjustable length struts being connected at their base ends with pivotable joints in adjacent pairs.

7. A machine as claimed in claim 6 wherein said adjustable length struts each comprise two telescoping members with an internal air strut to act as a mass counterbalance and with powered clamping means at an interface of the telescoping members.

8. A machine as claimed in claim 1, wherein:
   said three nodes are mounted generally vertically on said sub-frame;
   said struts are mounted generally horizontally;
   said strut extend generally horizontally from said sub-frame and movably support said platform horizontally displaced from said sub-frame.

9. A machine comprising elongate struts forming a hexapod structure that can be driven through machine nodes to vary the effective strut length, and
   wherein at least two struts share a bifurcated drive sphere, said hexapod structure comprising six elongate struts with a sub-frame and a platform movable relative thereto and six nodes, three of said nodes connecting alternate strut pair ends to the platform by multi-axis couplings and three of said nodes defined in said sub-frame comprising bifurcated drive spheres,
   each said bifurcated drive sphere being retained within a complimentary socket mounted on said sub-frame, each said bifurcated drive sphere retaining a pair of adjacent strut pairs such that adjacent struts of said pair can pass through said retained bifurcated drive sphere and cross over each other within said retained bifurcated drive sphere with pivotal movement about a common axis,
   wherein said bifurcated drive spheres each comprise two hemispheres, one for each strut passing through the respective bifurcated drive spheres, the two hemispheres being spherically arranged with respect to each other so as to be pivotable relative to each other about a common axis, and the spherically arranged hemispheres being retained in said complementary sockets providing for multi-axis movement thereof,
   wherein each of said hemispheres comprises a strut drive motor,
   wherein the strut drive motor is adapted to drive the respective strut through the respective hemisphere by means of a friction drive,
   wherein said friction drive comprises opposite pairs of driven rollers frictionally engaging opposite sides of the respective strut
   wherein said rollers are each coupled to larger diameter wheels which span the strut width and mutually contact each other in respective pairs, at least one such pair being driving by a pinion which is driven by the motor.

10. A machine as claimed in claim 9 wherein said pinion is coupled to a larger diameter wheel which is arranged to be driven by the motor by way of a pinion coupled to the motor drive shaft.

11. A machine as claimed in claim 9 wherein said wheels each retain an elastomeric band which in turn retains a flexible band, the arrangement being such that contact pressure between adjacent wheels or with a pinion flexes the outer band and compresses the elastomeric band.

12. A machine as claimed in claim 9, wherein said struts comprise elastomeric saddles on opposite sides thereof which each retain an elongate flexible rod to be contacted by said friction drive.

13. A machine comprising elongate struts forming a hexapod structure that can be driven through machine nodes to vary the effective strut length, and
   wherein at least two struts share a bifurcated drive sphere, said hexapod structure comprising six elongate struts with a sub-frame and a platform movable relative thereto and six nodes, three of said nodes connecting alternate strut pair ends to the platform by multi-axis couplings and three of said nodes defined in said sub-frame comprising bifurcated drive spheres,
   each said bifurcated drive sphere being retained within a complimentary socket mounted on said sub-frame, each said bifurcated drive sphere retaining a pair of adjacent strut pairs such that adjacent struts of said pair can pass through said retained bifurcated drive sphere and cross over each other within said retained bifurcated drive sphere with pivotal movement about a common axis,
   wherein said bifurcated drive spheres each comprise two hemispheres, one for each strut passing through the respective bifurcated drive sphere, the two hemispheres being spherically arranged with respect to each other so as to be pivotable relative to each other about a common axis, and the spherically arranged hemispheres being retained in said complementary sockets providing for multi-axis movement thereof, wherein the three bifurcated drive spheres are supported in a generally vertical plane, wherein the three bifurcated drive spheres are supported in a generally vertical plane by means of a cast or molded body which has a generally horizontally extending point defining a support for a horizontal worktable, and including a removable cover defining a wholly enclosed workspace with said cast or molded body.

14. A machine comprising elongate struts forming a hexapod structure that can be driven through machine nodes to vary the effective strut length, said hexapod structure comprising six elongate struts defining with a sub-frame and a platform movable relative thereto and six nodes, three of said six nodes connecting alternate strut pair ends to the platform by multi-axis couplings and another three of said six nodes defined in said sub-frame comprising bifurcated drive spheres, each said bifurcated drive sphere being retained within a complementary socket mounted on said sub-frame, each said bifurcated drive sphere retaining a pair of adjacent strut pairs such that adjacent struts of said pair can pass through said retained bifurcated drive sphere and cross over each other within said retained bifurcated drive sphere with pivotal movement about a common axis, two of said struts being movably connected together at one end so as to define a first tool support movable in space in dependence upon the lengths of said two struts, and a further two of said struts being movably connected together at one end to define a second tool support movable in space in dependence upon the lengths of said two struts, and a tool supported between said first and second tool supports, each said bifurcated drive sphere further comprising two separate hemispheres, said two separate hemispheres each containing at least one strut driving mechanism, and wherein said two separate hemispheres are retained within a single complementary socket mounted on said sub-frame, providing for multi-axis movement of said hemispheres, and wherein said two hemispheres are spherically arranged with face-to-face base planes so as to be rotatable relative to each other about a common axis perpendicular to the base plane of each hemisphere.

15. A machine as claimed in claim 14 wherein said machine nodes comprise spherical balls retained within complementary sockets permitting multi-directional pivotal movement of the balls.

16. A machine as claimed in claim 15 wherein said balls contain strut drive motors.

17. A machine as claimed in claim 16 wherein the struts are screw-threaded and the motors comprise driven members screw-threadedly engaged with the struts.

18. A machine as claimed in claim 14, wherein:

said three nodes are mounted generally vertically on said sub-frame;

said struts are mounted generally horizontally;

said strut extend generally horizontally from said sub-frame and movably support said platform horizontally displaced from said sub-frame.

19. A machine comprising a hexapod structure, said hexapod structure comprising six elongate struts defining with a sub-frame and a platform movable relative thereto and six nodes, three of said nodes connecting alternate strut pair ends to the platform by multi-axis couplings, and three of said nodes defined in said sub-frame comprising bifurcated drive spheres, each said bifurcated drive sphere being retained within a complementary socket mounted on said sub-frame, each said bifurcated drive sphere retaining a pair of adjacent strut pairs such that adjacent struts of said pair can pass through said retaining sphere and cross over each other within said retained bifurcated drive sphere with pivotal movement about a common axis, two of said struts being adjustable length struts spaced apart and journalled for multi-directional pivotal movement relative to said machine sub-frame at one end and movably connected together at their other ends so as to define a first tool support movable in free space in dependence upon the relative lengths of the two struts, each said bifurcated drive sphere further comprising two separate hemispheres, said two separate hemispheres each containing at least one strut driving mechanism, and wherein said two separate hemispheres are retained within said complementary socket mounted on said sub-frame, providing for multi-axis movement of said hemispheres, wherein said two separate hemispheres are spherically arranged with face-to-face base planes so as to be rotatable relative to each other about a common axis perpendicular to the base plane of each hemisphere and wherein a second tool support movable in free space is defined by the movably connected ends of two further adjustable length struts which at their other ends are spaced apart and journalled for multi-directional pivotal movement relative to said sub-frame.

20. A machine as claimed in claim 19 wherein said machine sub-frame is substantially vertically oriented such that in a median position, said first and second tool supports are generally vertically arranged.

21. A machine as claimed in claim 20 wherein said machine sub-frame comprises a molding or casting comprising a generally vertical part supporting said struts and a generally horizontal part defining a worktable, a cover being removably provided which, when in position, completely encloses said workspace.

22. A machine as claimed in claim 19, wherein:

said three nodes are mounted generally vertically on said sub-frame;

said struts are mounted generally horizontally;

said strut extend generally horizontally from said sub-frame and movably support said platform horizontally displaced from said sub-frame.

23. A machine comprising elongate struts forming a hexapod structure that can be driven through machine nodes to vary the effective strut length, and wherein at least two struts share a bifurcated drive sphere said hexapod structure comprising six elongate struts with a sub-frame and a platform movable relative thereto and six nodes, three of said nodes connecting alternate strut pair ends to the platform by multi-axis couplings and three of said nodes defined in said sub-frame comprising bifurcated drive spheres, each said bifurcated drive sphere being retained within a complementary socket mounted on said sub-frame, each said bifurcated drive sphere retaining a pair of adjacent strut pairs such that adjacent struts of said pair can pass through said retained bifurcated sphere and cross over each other within said retained bifurcated drive sphere with pivotal movement about a common axis, a friction drive motor for effecting relative longitudinal movement between the motor and an elongate strut, said friction drive motor comprising opposite pairs of driven rollers frictionally engaging opposite sides of the elongate strut, said opposed pairs of driven rollers being coupled to larger diameter wheels which frictionally engage with each other across the width of said elongate member, each said bifurcated drive sphere further comprising two separate hemispheres, said two separate hemispheres each containing at least one strut driving mechanism, and wherein said two separate hemispheres are retained within a single complimentary socket mounted on said sub-frame, providing for multi-axis movement of said hemispheres, and wherein the said two hemispheres are spherically arranged with face-to-face base planes so as to be rotatable relative to each other about a common axis perpendicular to the base plane of each hemisphere.

24. A machine as claimed in claim 23, wherein:

said three nodes are mounted generally vertically on said sub-frame;

said struts are mounted generally horizontally;

said strut extend generally horizontally from said sub-frame and movably support said platform horizontally displaced from said sub-frame.

25. A machine comprising elongate struts forming a hexapod structure that can be driven through machine nodes to vary the effective strut length, and wherein at least two struts share a bifurcated common node said hexapod structure comprising six elongate struts with a sub-frame and a platform movable relative thereto and six nodes, three of said nodes connecting alternate strut pair ends to the platform by multi-axis couplings and three of said nodes defined in said sub-frame comprising bifurcated common nodes retaining adjacent strut pairs such that the struts can pass through said bifurcated common node and cross over each other with pivotal movement about a common axis;

said bifurcated common nodes each comprise two hemispheres comprising a strut drive motor, one for each strut passing through the respective bifurcated common node, the two hemispheres being spherically arranged with respect to each other so as to be pivotal relative to each other about a common axis, and spherical arrangement being retained in a complimentary socket providing for multi axis movement thereof;

said strut motor driving the respective strut through the respective hemispheres by means of a friction drive, said friction drive having opposite pairs of driven rollers frictionally engaging opposite sides of the respective strut;

said rollers being coupled to larger diameter wheels which span the strut width and mutually contact each other in respective pairs, at least one such pair being driven by a opinion which is driven by the motor.

26. A machine comprising elongate struts forming a hexapod structure that can be driven through machine nodes to vary the effective strut length, and wherein at least two struts share a bifurcated common node said hexapod structure comprising six elongate struts with a sub-frame and a platform movable relative thereto and six nodes, three of said nodes connecting alternate strut pair ends to the platform by multi-axis couplings and three of said nodes defined in said sub-frame comprising bifurcated common nodes retaining adjacent strut pairs such that the struts can pass through said bifurcated common node and cross over each other with pivotal movement about a common axis;

said bifurcated common nodes each comprise two hemispheres comprising a strut drive motor, one for each strut passing through the respective bifurcated common node, the two hemispheres being spherically arranged with respect to each other so as to be pivotal relative to each other about a common axis, and spherical arrangement being retained in a complimentary socket providing for multi axis movement thereof;

said strut motor driving the respective strut through the respective hemispheres by means of a friction drive, said friction drive having opposite pairs of driven rollers frictionally engaging opposite sides of the respective strut;

said rollers being coupled to larger diameter wheels which span the strut width and mutually contact each other in respective pairs, at least one such pair being driven by a pinion which is driven by the motor, wherein said struts comprise elastomeric saddles on opposite sides thereof which each retain an elongate flexible rod to be contacted by said friction drive.

27. A machine comprising elongate struts forming a hexapod structure that can be driven through machine nodes to vary the effective strut length, and wherein at least two struts share a bifurcated common node said hexapod structure comprising six elongate struts with a sub-frame and a platform movable relative thereto and six nodes, three of said nodes connecting alternate strut pair ends to the platform by multi-axis couplings and three of said nodes defined in said sub-frame comprising bifurcated common nodes retaining adjacent strut pairs such that the struts can pass through said bifurcated common node and cross over each other with pivotal movement about a common axis;

said bifurcated common nodes each comprise two hemispheres comprising a strut drive motor, one for each strut passing through the respective bifurcated common node, the two hemispheres being spherically arranged with respect to each other so as to be pivotal relative to each other about a common axis, and spherical arrangement being retained in a complimentary socket providing for multi axis movement thereof;

said strut motor driving the respective strut through the respective hemispheres by means of a friction drive, said friction drive having opposite pairs of driven rollers frictionally engaging opposite sides of the respective strut;

said rollers being coupled to larger diameter wheels which span the strut width and mutually contact each other in respective pairs, at least one such pair being driven by a pinion which is driven by the motor, wherein the three bifurcated common nodes are supported in a generally vertical plane, the three bifurcated common nodes are supported in a generally vertical plane by means of a cast or molded body which has a generally horizontally extending point defining a support for horizontal work table and a removable cover defining a wholly enclosed workspace within said cast or molded body.

28. A machine comprising elongate struts forming a hexapod structure, further comprising a sub-frame and a platform movable relative thereto, a first set of three nodes connecting alternate strut pair ends to the platform by multi-axis couplings, and a second set of three nodes, defined in said sub-frame and further comprising bifurcated drive spheres, each said bifurcated drive sphere further comprising two separate hemispheres, said two separate hemispheres each containing at least one strut driving mechanism, and wherein said two separate hemispheres are retained within a single socket mounted on said sub-frame, providing for multi-axis movement of said hemispheres, and wherein the separate hemispheres are arranged having face-to-face base planes so as to be rotatable relative to each other about a common axis perpendicular to the base plane of each hemisphere, whereby one separate hemisphere of the respective bifurcated drive sphere retains one strut of a pair of adjacent struts and the other separate hemisphere of the same bifurcated drive sphere retains the other strut of said pair of adjacent struts such that said struts can pass through, and cross over within, said bifurcated drive sphere.

* * * * *